(12) United States Patent
Maangat et al.

(10) Patent No.: US 7,697,600 B2
(45) Date of Patent: Apr. 13, 2010

(54) PROGRAMMABLE RECEIVER EQUALIZATION CIRCUITRY AND METHODS

(75) Inventors: Simardeep Maangat, Sunnyvale, CA (US); Sergey Shumarayev, San Leandro, CA (US); Wilson Wong, San Francisco, CA (US); ThuNgoc Tran, San Jose, CA (US)

(73) Assignee: Altera Corporation, San Jose, CA (US)

( * ) Notice: Subject to any disclaimer, the term of this patent is extended or adjusted under 35 U.S.C. 154(b) by 1214 days.

(21) Appl. No.: 11/182,658

(22) Filed: Jul. 14, 2005

(65) Prior Publication Data

US 2007/0014344 A1    Jan. 18, 2007

(51) Int. Cl.
*H03H 7/30* (2006.01)

(52) U.S. Cl. .................. 375/229; 375/232; 327/182; 327/183

(58) Field of Classification Search ......... 375/229–233, 375/269, 279, 362, 355, 308, 334, 182, 183, 375/111, 337; 327/182, 183, 111, 337, 141, 327/233–236; 257/93, 261, 446, 499; 708/5, 708/8, 21, 404, 233, 235, 252, 323; 333/18, 333/28 R; 326/39
See application file for complete search history.

(56) References Cited

U.S. PATENT DOCUMENTS

| | | | | |
|---|---|---|---|---|
| 4,430,744 A | * | 2/1984 | Johnson | 375/232 |
| 4,887,278 A | * | 12/1989 | Gupta | 375/219 |
| 5,257,286 A | | 10/1993 | Ray | |
| 5,642,079 A | * | 6/1997 | Whiteside | 330/260 |
| 6,249,544 B1 | * | 6/2001 | Azazzi et al. | 375/233 |
| 6,424,480 B1 | * | 7/2002 | Bhandari et al. | 360/67 |
| 6,459,727 B1 | * | 10/2002 | Cho et al. | 375/222 |
| 6,870,404 B1 | | 3/2005 | Maangat | |
| 6,894,632 B1 | * | 5/2005 | Robinson | 341/143 |
| 7,333,564 B2 | * | 2/2008 | Sugiyama et al. | 375/297 |
| 2004/0138876 A1 | * | 7/2004 | Kallio et al. | 704/209 |
| 2004/0141552 A1 | | 7/2004 | Yang et al. | |
| 2005/0095988 A1 | | 5/2005 | Bereza et al. | |
| 2005/0157780 A1 | * | 7/2005 | Werner et al. | 375/232 |
| 2006/0013295 A1 | * | 1/2006 | Kuijk et al. | 375/229 |

OTHER PUBLICATIONS

Gondi, S., et al., "A 10Gb/s CMOS Adaptive Equalizer for Backplane Applications", Solid-State Circuits Conference, 2005. Digest of Technical Papers, ISS CC 2005 IEEE International, San Francisco, CA, Feb. 6-10, 2005; Piscataway, NJ, IEEE, Jan. 2005, p. 328-329, 601.

* cited by examiner

*Primary Examiner*—David C Payne
*Assistant Examiner*—Rahel Guarino
(74) *Attorney, Agent, or Firm*—Ropes & Gray LLP (57) ABSTRACT

Data signals transmitted over transmission media suffer from attenuation caused by the transmission media. Equalization circuitry may be provided to compensate for attenuation caused by the transmission media. Equalization circuitry may include multiple stages arranged in series to allow the frequency responses of the stages to aggregate together. Each stage may be programmable to insert a zero, which causes the frequency response of the stage to increase in magnitude by 20 dB/decade. The frequency location of the zero may also be programmable to allow each stage to contribute a certain amount of gain for a specific frequency. Each stage may also be programmable to determine the location of poles for reduction of high frequency noise and cross-talk cancellation.

33 Claims, 6 Drawing Sheets

PROGRAMMABLE RECEIVER EQUALIZATION CIRCUITRY AND METHODS

BACKGROUND OF THE INVENTION

This invention relates to digital data communication, and more particularly to methods and apparatus for automatically adjusting the circuitry involved in such communication to compensate for losses in a digital data signal transmitted from driver circuitry to receiver circuitry.

Different signal transmission media tend to have different signal transmission characteristics. For example, a cable may have a different transmission characteristic than a printed circuit board backplane. In addition, each instance of any given type of transmission medium may have somewhat different characteristics, within a range that is typical for that type of transmission medium. It is also possible for a transmission medium to change over time or as a result of other environmental factors.

Among the characteristics that can adversely affect the performance of a transmission medium are attenuation and phase shift. It is common for the amount of attenuation and phase shift to be frequency-dependent. Typically, both attenuation and phase shift tend to increase with increasing frequency. For convenience herein, attenuation, phase shift, and other forms of signal degradation are sometimes referred to generically as "losses."

In order to have satisfactory transmission of a digital data signal, especially at high data rates or high frequencies, it may be necessary to compensate for losses in the signal being transmitted. Moreover, because such losses can vary from instance to instance and from time to time, it can be desirable for such compensation to be at least partly automatic or adaptive. A term that is often used for such compensation is equalization. The term pre-emphasis is also sometimes used for compensation or equalization that is performed at the driver, i.e., anticipating losses that will occur and compensating for them by modifying the signal before it is transmitted. When the term pre-emphasis is used, equalization may then be used as the term for compensation performed at the receiver. Although equalization is described as being performed primarily at the receiver, it should be recognized that some aspects of this invention may also be applied to equalization (pre-emphasis) performed at the driver.

Commonly, equalization is provided by non-programmable circuits that have a fixed amount of gain for a particular frequency. Such circuits may be identified and used with transmission media having suitable attenuation characteristics. For example, an equalization circuit providing 2 dB of gain to a 100 MHz signal may be used with a backplane that attenuates 100 MHz signals by 2 dB.

Programmable circuitry such as programmable logic device ("PLD") circuitry has capabilities that can be useful in supporting adaptive equalization. For example, a PLD or PLD circuitry may be one of the components involved in transmitting or receiving a signal needing adaptive equalization, or such circuitry may be used for controlling certain aspects of the circuitry that transmits and/or receives such a signal. Such programmable circuitry (e.g., PLD circuitry) can be especially useful in implementations of this invention because programmability aids in providing different parameters and/or procedures for addressing different transmission loss characteristics that may be encountered.

SUMMARY OF THE INVENTION

Programmable receiver equalization circuitry may be provided to compensate for attenuation of received data signals caused by a transmission medium. The equalization circuitry may be implemented as a cascade of identical stages.

Each stage may be independently programmable. Each stage may be coupled to a configurable device (e.g., configuration RAM) that provides the stage with parameters by which to operate. The overall frequency response of the equalization circuitry may be an aggregate of the frequency responses of the individual stages.

The DC gain of each stage may be programmable. For example, if the peak-to-peak voltage of the received data signals is too low, one or more of the stages may be programmably controlled to increase the peak-to-peak voltage of the received data signals.

Each stage may also provide AC gain to the received data signals by inserting a zero into its transfer function. Whether or not a stage inserts a zero may be programmably controlled. The inserted zero may cause the magnitude of the frequency response of the stage to increase at a rate of 20 dB/decade at the frequency at which it is inserted.

In order to obtain a desired gain at a certain frequency (e.g., the frequency corresponding to the data rate of the data signal), each stage may be programmably controlled to select the frequency location of the inserted zero. In some embodiments, the frequency location of the inserted zero may be limited to a frequency range.

When more than one stage is configured to insert a zero, the frequency ranges in which the stages may insert zeros may be staggered to cover a wide frequency range. When the frequency locations of the zeros are spread out, the slope of the gain provided by the equalization circuit increases across the wide frequency range (i.e., the slope increases by 20 dB/decade at the frequency location of each zero). This allows the frequency response of the equalization circuit to more closely fit the frequency response of the transmission medium, whose slope becomes more negative as frequency increases.

The transfer function of each stage may also include poles. A pole in the transfer function of a stage causes the gain of the stage to decrease by 20 dB/decade. Each stage may also programmably control the frequency location of the poles to reduce high frequency noise and to enable cross-talk cancellation.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
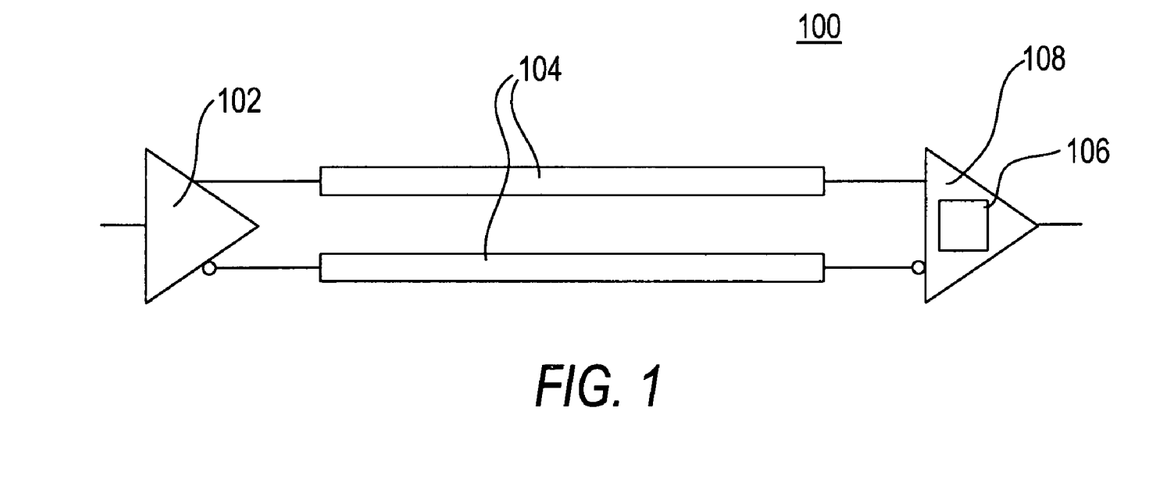
FIG. 1 is a block diagram of an illustrative data transfer system in accordance with the present invention.

FIG. 1 is a block diagram of a data transfer system 100 in accordance with the present invention. As shown in FIG. 1, data transfer system 100 includes a driver 102, a transmission medium 104, an equalization circuit 106, and a receiver 108.

Driver 102 may be part of a device that is configured to transmit data at high data rates. For example, driver 102 may be a component of a programmable logic device, a transceiver, an application-specific integrated circuit (ASIC), or any other suitable device. Driver 102 may employ any suitable serial communications protocol, such as, for example, low-voltage differential signaling (LVDS) in transmitting data. In some embodiments, driver 102 may be tri-statable, which allows multiple drivers (not shown) to be connected to multiple receivers (not shown).

Transmission medium 104 may carry data transmitted by driver 102 to receiver 108. Transmission medium 104 may be any suitable medium, such as, for example, a printed circuit board backplane, a transmission line, a cable, air (i.e., for wireless applications), or any other suitable medium.

When a data signal is transmitted across transmission medium 104, the power of the data signal may decrease as a result of attenuation. The amount of attenuation caused by transmission medium 104 may depend on properties of transmission medium 104, such as, for example, resistivity, skin effect, capacitance losses, and inductive interference. The amount of attenuation caused by transmission media is likely to differ from medium to medium. For example, a copper wire will have different attenuation properties than a 2.5 GHz fiber optic backplane. In addition, for a given transmission medium, the amount of attenuation may be different for data transmitted at different data rates. Generally, for a given medium, the amount of attenuation caused by that medium increases as the frequency or data rate increases. Furthermore, the slope of the attenuation also becomes more negative as the frequency or data rate increases.

Receiver 108 may be configured to receive and process data transmitted by driver 102 across transmission medium 104. Receiver 108 may be a component of a device, such as, for example, a programmable logic device, a transceiver, an application-specific integrated circuit (ASIC), or any other suitable device. Receiver 108 may include circuitry for restoring received signals to full-scale digital signals.

Equalization circuit 106 may be provided to boost the power of data signals and compensate for the attenuation caused by transmission medium 104. For example, if a 1 Gbps data signal attenuates by 10 dB while traveling across transmission medium 104, equalization circuit 106 may be configured to amplify 1 GHz signals by 10 dB.

In some embodiments, equalization circuit 106 may be implemented on receiver 108. In some embodiments, equalization circuit 106 may be implemented as a component separate from receiver 108.

Equalization circuit 106 may be programmable to compensate for various amounts of attenuation. In some embodiments, equalization circuit 106 may be configured to allow a user to input parameters to specify the amount of equalization to be provided by equalization circuit 106. For example, if a given backplane is known to attenuate 1 GHz signals by 10 dB, equalization circuit 102 may be programmed to provide 10 dB of gain to 1 GHz data signals traveling across the given backplane. In some embodiments, equalization circuit 106 may automatically determine the amount of equalization to provide. For example, equalization circuit 106 may use feedback to automatically determine a suitable level of gain to apply to the input signal. In another example, equalization circuit 106 may automatically increase its gain until the power of the amplified signal reaches a desired level.

Figure 2:
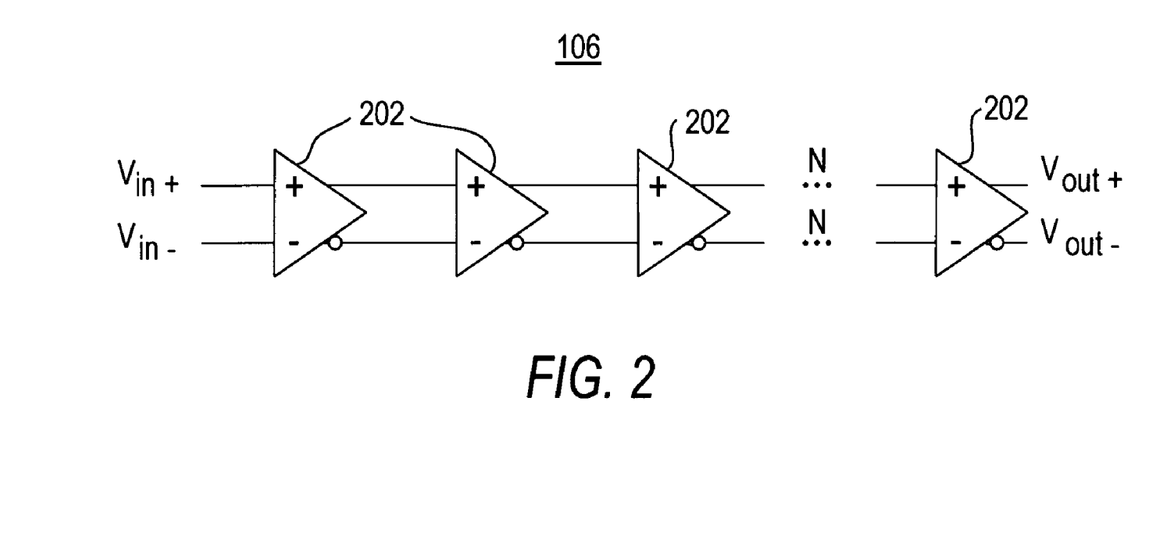
FIG. 2 is a block diagram of an illustrative equalization circuit in accordance with the present invention.

FIG. 2 is a block diagram of equalization 106 circuit in accordance with the present invention. As shown in FIG. 2, equalization circuit 106 may be implemented as a cascade of "N" stages 202. The actual number of stages implemented in equalization circuit 106 may depend on factors, such as, for example, the data rate supported by transmission medium 104 and the amount of attenuation expected from transmission medium 104. For example, a three-stage equalization circuit may sufficiently compensate for attenuation caused by a 6.5 Gbps backplane. However, a four-stage equalization circuit may be required to compensate for attenuation caused by a 10 Gbps backplane. Still, in some embodiments, equalization circuit 106 may be implemented with a single stage 202.

As shown in FIG. 2, each stage 202 of equalization circuit 106 receives a differential input and outputs a differential output. Whether equalization circuit 106 is differential or single-ended depends on the type of serial communication employed by driver 102 and receiver 108 (FIG. 1). For example, low-voltage differential signaling (LVDS) is a serial communications standard that utilizes differential signaling. In another example, RS-232 is a serial communication standard that utilizes single-ended signals. Although the present invention is discussed in connection with a system using differential signals, it should be understood by those skilled in the art that the principles of this invention could be applied to systems using single-ended signals.

Each stage 202 of equalization circuit 106 may shape the input signal in accordance with its frequency response. The frequency response of each stage 202 may resemble that of a band-limited high pass filter. For example, the magnitude of the frequency response of a stage of equalization circuit 106 is initially constant at the DC gain level. At a first "cutoff" frequency (where a zero is located), the magnitude of the frequency response begins to increase at 20 dB/decade. Although each stage 202 of equalization circuit 106 is discussed as having only one zero, it should be noted by those skilled in the art that each stage 202 may be implemented as having more than one zero.

The frequency response of a stage 202 may decrease at a second "cutoff" frequency, which is where one or more poles are located. The rate of decrease may depend on the number of poles present at that frequency and the magnitude of the frequency response falls 20 dB/decade for every pole that is present.

Cascading all of stages 202 in equalization circuit 106 causes the frequency response characteristics of the stages to aggregate together. For example, if the first stage of a two-stage equalization circuit provides a gain of 10 dB at 1 GHz and the second stage provides a gain of 15 dB at 1 GHz, the overall gain of the two-stage equalization circuit for 1 GHz signals is 25 dB.

Each stage 202 of equalization circuit 106 may be fully programmable. Stages 202 may be programmably controlled by configurable devices, such as, for example, configuration RAM cells, fuse-based devices, antifuses, programmable-erasable-read-only memories (PROMS), erasable PROMS (EPROMS), electrically-erasable PROMS (EEPROMS), flash memory, and any other suitable device. In some embodiments, the configurable device may store a control signal for controlling a stage.

In some embodiments, the DC gain of stages 202 may be programmable. The configuration device for each stage may store a control signal to indicate to the stage the amount of DC gain to provide. DC gain causes the peak-to-peak voltage of the data signal to be increased. For example, if a stage that is programmed to provide 3 dB of DC gain receives a 1 GHz signal and a 10 GHz signal, the peak-to-peak voltages of both signals will be increased by 3 dB.

In some embodiments, the AC gain of stages 202 may be programmable. AC gain may be provided by inserting a zero at a specific frequency in the transfer function for that stage. A stage 202 may be programmably controlled to insert a zero and the frequency location of an inserted zero may also be programmably controlled.

As stated above, stages 202 may be programmably controlled to insert zeros. Not every stage of equalization circuit 106 has to contribute a zero. For example, if a four-stage equalization circuit is used to equalize data transmitted at a low data rate, only two zeros may be necessary for equalization circuit 106 to compensate for attenuation. In this example, two of the four stages may be programmably controlled to contribute zeros. The other two stages may be programmably controlled to not contribute zeros.

When a stage 202 is programmably controlled to insert a zero, the magnitude of the frequency response increases by 20 dB/decade from the frequency location of the zero. For example, if a zero has been inserted at 1 GHz, the magnitude of the frequency response increases at a rate of 20 dB/decade starting at 1 GHz. If two zeros have been inserted at 1 GHz, the magnitude of the frequency response increases at a rate of 40 dB/decade starting at 1 GHz. Every additional zero that is inserted increases the rate at which the gain increases by an additional 20 dB/decade. Inserting multiple zeros allows equalization circuit 106 to compensate for large amounts of attenuation caused by transmission medium 104 (FIG. 1).

The frequency location of the zeros inserted by stages 202 may also be programmably controlled. Each stage 202 that contributes a zero may control where the zero is located independently of the other stages. For example, a zero may be inserted at 1 GHz if a 20 dB gain is desired at 10 GHz because the zero causes the gain to increase by 20 dB/decade. If less than 20 dB of gain is desired, then the frequency location of the zero may be increased to decrease the gain at 10 GHz. In another example, if the user measures the frequency response of a backplane, and observes a pole at 2.5 GHz, equalization circuit 106 may be programmed to insert a zero at 2.5 GHz to cancel the attenuation caused by the pole.

In some embodiments, stages 202 may be limited to inserting zeros within predetermined frequency ranges. In some embodiments, the frequency ranges may be programmably controlled, i.e., the upper and lower frequency limits for each stage may be set by a configurable device. For example, a stage 202 may be limited to inserting a zero between 1 and 1.5 GHz (i.e., inserting a zero between 1 and 1.5 GHz sufficiently controls the amount of gain at a desired frequency location, e.g., 2 GHz). It would be unpractical to allow stage 202 to insert zeros at any arbitrary frequency, especially those frequencies that are greater than the frequencies typically used to transmit data signals.

The configurable device may apply an n-bit control signal to a stage to select one of $2^n$ evenly-spaced frequencies within the predetermined frequency range for that stage. For example, if a three-bit control signal is used to select a frequency location between 1 and 1.5 GHz, the control signal may select from eight evenly-spaced frequencies between 1 and 1.5 GHz. In another example, a four-bit control signal allow the stage to select from sixteen frequencies. Providing more control bits may allow for greater precision in selecting frequencies, and therefore, greater control over the gain of stage 202.

In some embodiments, certain control signal values may be reserved for functions other than selecting frequency values. For example, one control signal value may be reserved for indicating when a zero should not be inserted. In this example, the remaining $2^n-1$ values may be reserved for selecting frequencies for inserting zeros.

In some embodiments, if equalization circuit 106 includes a plurality of stages 202, it may be beneficial to stagger the frequency ranges of stages 202 such that there is some overlap between frequency ranges. This allows zeros to be inserted over a wide and continuous frequency range. For example, a first stage may be configured to insert a zero between 2 and 3.25 GHz and a second stage may be configured to insert a zero between 2.75 and 4 GHz.

Also, spreading out the frequency locations of the zeros causes the slope of the frequency response to increase as the frequency increases, which allows the frequency response of the equalization circuit to more closely counter the frequency response of the transmission medium, whose slope becomes more negative as frequency increases.

Inserting multiple zeros at different frequency locations also provides greater control over the slope of the frequency response of equalization circuit 106. For example, if equalization circuit 106 has two zeros, both at 1 GHz, equalization circuit 106 contributes 40 dB of gain at 10 GHz. If only 35 dB of gain is desired at 10 GHz, instead of increasing the frequency of both the zeros, the frequency of just one of the zeros may be increased, thus preserving the bandwidth of equalization circuit 106.

Equalization circuit 106 may also include capacitive loading. In some embodiments, capacitive loading may be present on each stage of equalization circuit 106. The amount of capacitive loading on each stage 202 may be programmably controllable. In some embodiments, capacitive loading may be present at the output of equalization circuit 106. The amount of capacitive loading on equalization circuit 106 may be programmably controllable. The amount of capacitive loading determines the frequency location of one or more poles in the transfer function of equalization circuit 106, which determines where the frequency response begins to roll-off.

The frequency location of poles may assist in the reduction and/or cancellation of crosstalk. In some embodiments, the frequency location of the poles may be set to the frequency of the data signal (e.g., 1 GHz for a 1 Gbps data signal). This causes signals with frequencies above the frequency of the data signal to be suppressed (or at least not further boosted). In some embodiments, the frequency location of the poles may be set low enough to prevent high frequency signals from being amplified. Crosstalk reduction/cancellation may be used in low-frequency applications where high frequency noise may have coupled onto transmission medium 104 (FIG. 1).

Figure 3A:
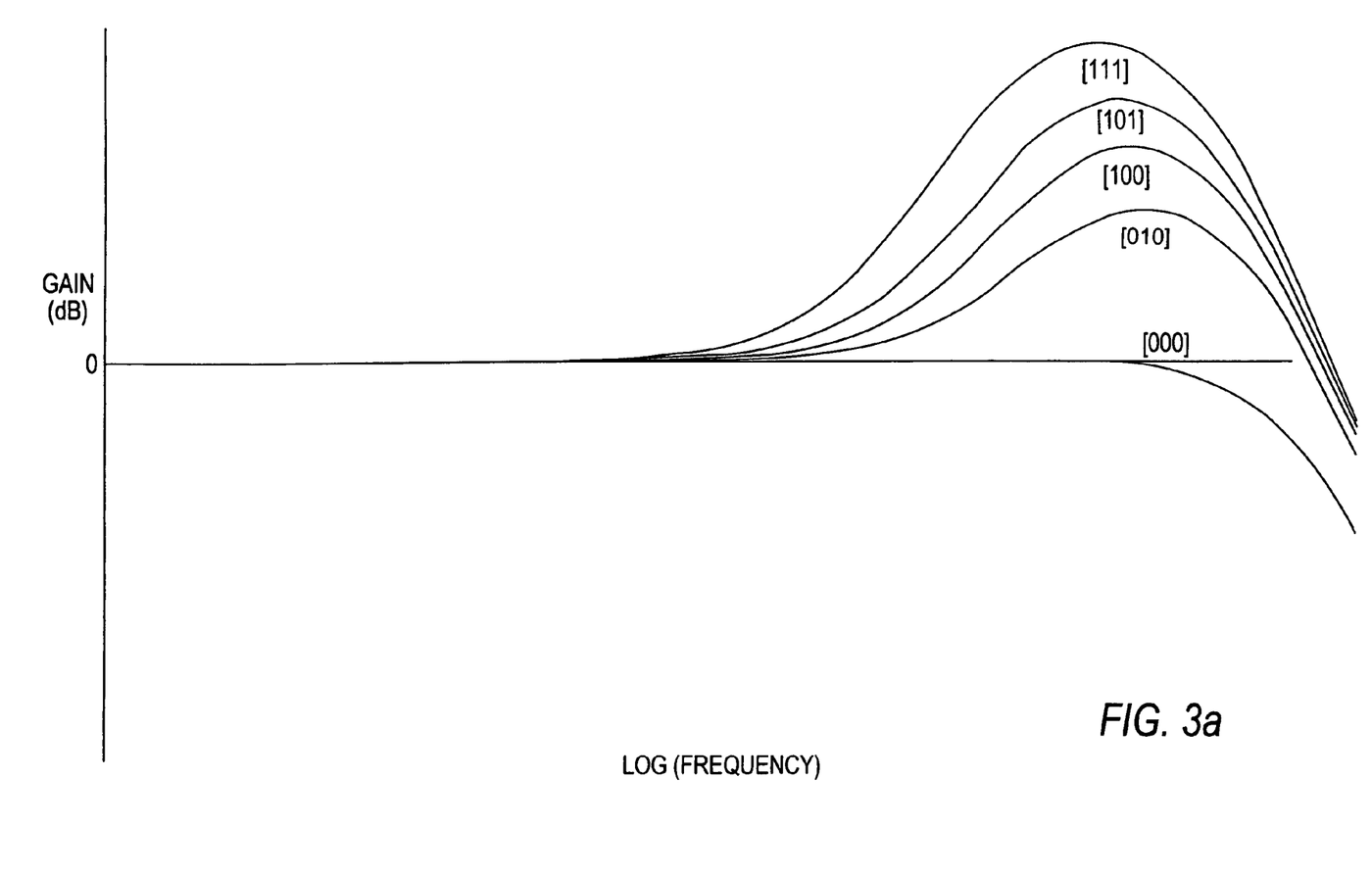
FIG. 3a is a Bode plot that illustrates the programmable gain functionality provided by a one-stage equalization circuit in accordance with the present invention.

FIG. 3a is a Bode plot that illustrates the programmable gain functionality provided by one of stages 202 in equalization circuit 106 in accordance with the present invention. In some embodiments, the amount of gain provided by stage 202 is controlled by a n-bit control signal. As shown in FIG. 3a, a three-bit control signal is used to vary the frequency response of the equalization circuit.

In some embodiments, the control signal determines whether stage 202 is to insert a zero and if so, also the frequency at which the zero is inserted. For example, when a [000] control signal is applied to stage 202, stage 202 does not insert any zeros to its transfer function. In this example, and as shown in FIG. 3a, stage 202 does not produce any gain with a [000] control signal.

Control signals other than [000] may determine the frequency at which the zero is inserted. In some embodiments, stage 202 may be configured to insert zeros only within a predetermined range of frequencies. For example, in FIG. 3a, the frequency locations of the zeros range from 5 MHz to 50 MHz. The control signal may determine where, within the range of frequencies, the zero is inserted. In some embodiments, if the binary value of the control signal is low, then the zero may be inserted towards the lower end of the frequency range. In some embodiments, if the binary value of the control signal is low, then the zero may be inserted towards the higher end of the frequency range. In this example, the control signal may select one of seven even-spaced frequencies at which to insert a zero.

Generally, if a zero is inserted at a lower frequency, stage 202 will produce more gain. As shown in FIG. 3a, a [111] input produces more gain than a
input and the zero insertion point on the [111] curve is at a lower frequency than the zero insertion point on the [101] curve.

A user, in deciding which control signal to apply to stage 202, may take into account the amount of attenuation caused by transmission medium 104 (FIG. 1) at 5 GHz. For example, if the user has measured the frequency response of transmission medium 104 and knows that transmission medium 104 will cause a 3 GHz data signal to attenuate by 6 dB, the user may select a control signal of [101] to provide 6 dB of gain to the data signal.

Figure 3B:
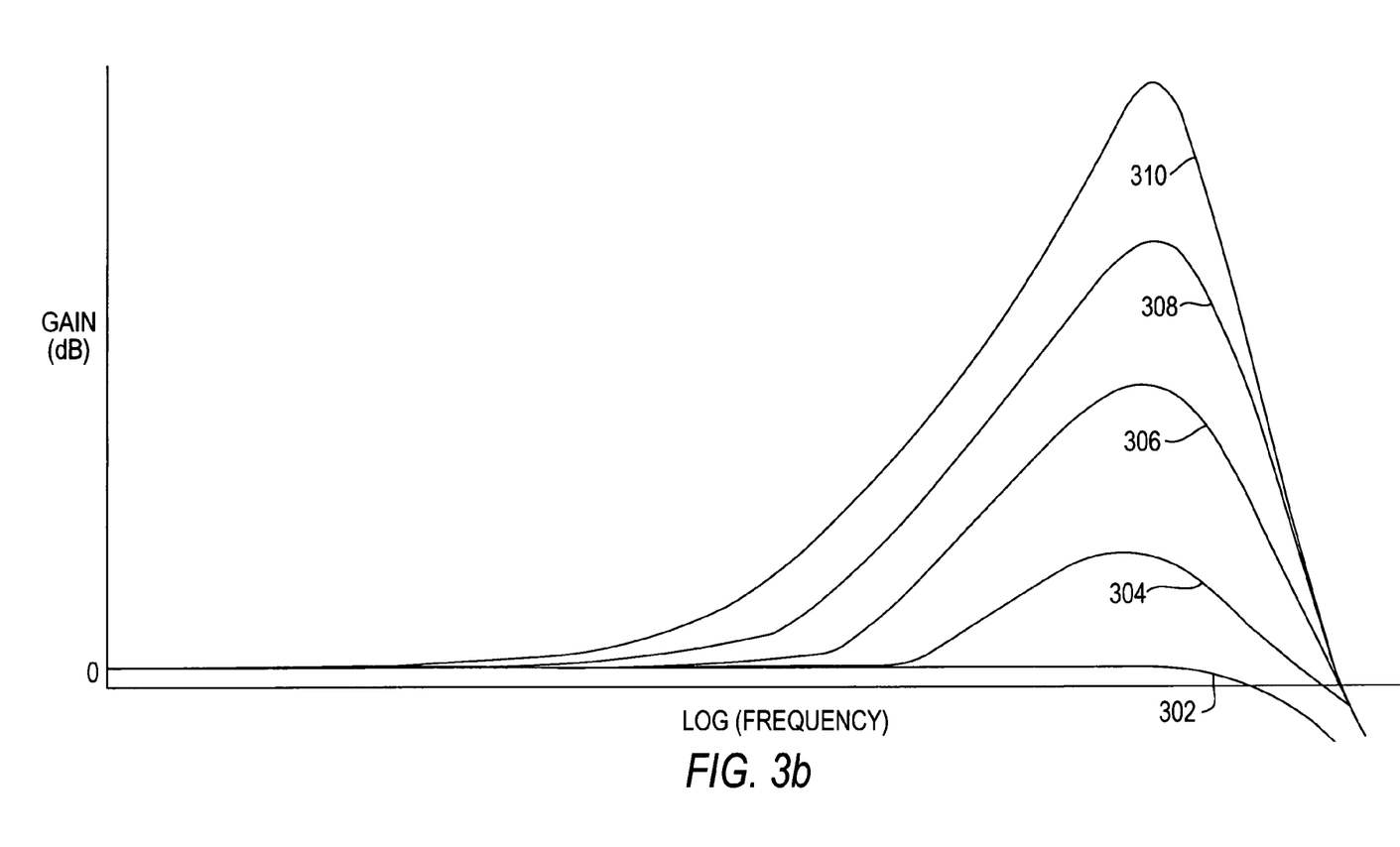
FIGS. 3b and 3c are Bode plots that illustrate the programmable slope functionality of a multi-stage equalization circuit in accordance with the present invention.
Figure 3C:
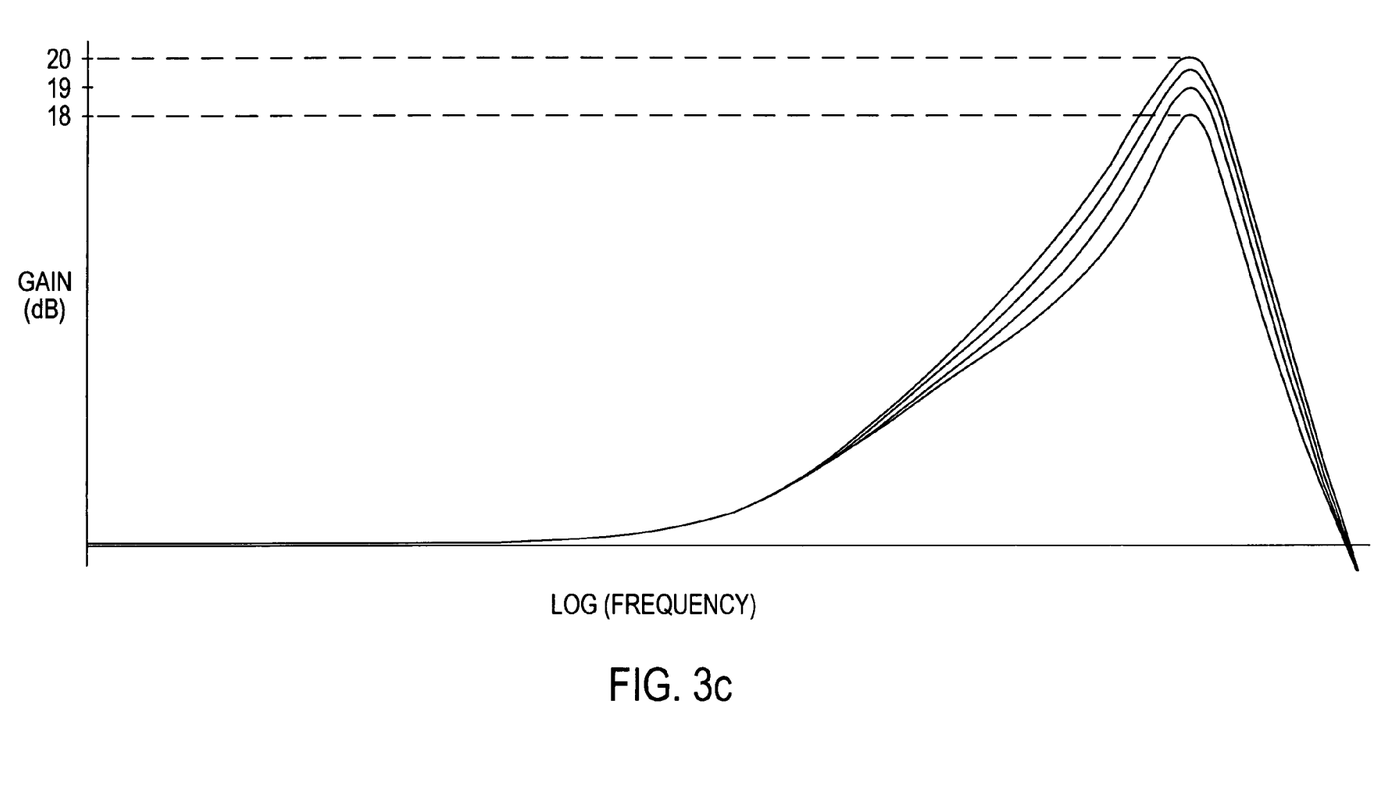

FIGS. 3b and 3c are Bode plots that illustrate the programmable slope functionality of equalization circuit 106 in accordance with the present invention.

FIG. 3b illustrates that equalization circuit 106 may be programmably controlled to produce frequency responses similar to curves 302, 304, 306, 308, and 310, in which each curve has a different slope. Stages 202 may be programmably controlled to either contribute a zero or not contribute a zero. For every stage 202 that contributes a zero, the gain of equalization circuit 106 increases by an additional 20 dB/decade from the frequency at which the zero is added. For example, in a four-stage equalization circuit, slopes of 0, 20, 40, 60, and 80 dB/decade may be achieved, depending on the number of stages contributing zeros.

A frequency response curve such as curve 302 may be achieved when none of the stages in the equalization circuitry have been programmed to contribute zeros. A frequency response curve such as curve 304 may be achieved when one of the stages in the equalization circuitry has been programmed to contribute a zero at 1 GHz. Likewise, frequency response curves, such as curve 306, 308, or 310, may be achieved when two, three, or four stages in the equalization circuitry, respectively, have been programmed to contribute zeros at 1 GHz.

As shown in FIG. 3b, frequency response curves with greater slopes can achieve greater gains. Programmably controlling the slope of the frequency response of equalization circuit 106 provides additional control over the AC gain of equalization circuit 106. In particular, programming equalization circuit 106 to have a large slope (i.e., multiple zeros) allows equalization circuit 106 to compensate for attenuation caused by high-speed transmission of data across transmission medium 104 (FIG. 1), which typically have multiple poles and suffer from large amounts of attenuation.

FIG. 3c illustrates one approach of programmably controlling the gain of an equalization circuit 106 that has multiple stages. As shown in FIG. 3b, stages 202 in equalization circuit 106 may be programmably controlled to insert zeros. In order to show the effect of multiple zeros on the slope of the frequency response, the frequency locations of all the zeros in FIG. 3b were set to the same frequency. As shown in FIG. 3c, changing the frequency locations of the zeros provides greater control in the shape of the frequency response curve.

In particular, as shown in FIG. 3c, frequency response curves 320, 322, 324, and 326 are all very similar. However, there are clearly differences in the magnitudes of the frequency response curves. For example, the maximum gain of curve 326 is over 20 dB, whereas the maximum gain of curve 320 is over 18 dB. In another example, curve 320 has a noticeable bend in its frequency response at just over 2 GHz. These differences between the curves are caused by zeros being inserted at different frequency locations.

If the equalization circuit contributes more than one zero, the gain at any given frequency may be fine tuned by changing the frequency location of individual zeros. If the frequency location of a zero is lowered, then the overall gain increases. On the other hand, if the frequency location of that zero is increased, then the overall gain decreases. For example, as shown in FIG. 3, curves 320 and 326 both have a first zero at a first frequency. Curves 320 and 326 also have second zeros. But because curve 320 has a lower gain than curve 326 because the second zero of curve 320 is at a higher frequency location than the second zero for curve 326.

Allowing zeros to be inserted at different frequency locations allows for greater precision in controlling the gain of the frequency response at one frequency and also the shape of the frequency response as a whole.

Inserting zeros at different frequency locations also allows equalization circuit 106 to more closely counter the attenuation of transmission medium 104 (FIG. 1), which has multiple poles spread out over different frequency locations. Theoretically, equalization circuit 106 (FIG. 2) may exactly compensate for attenuation over all frequencies caused by transmission medium 104 if zeros are inserted at the frequency locations of the poles in transmission medium 104.

Figure 3D:
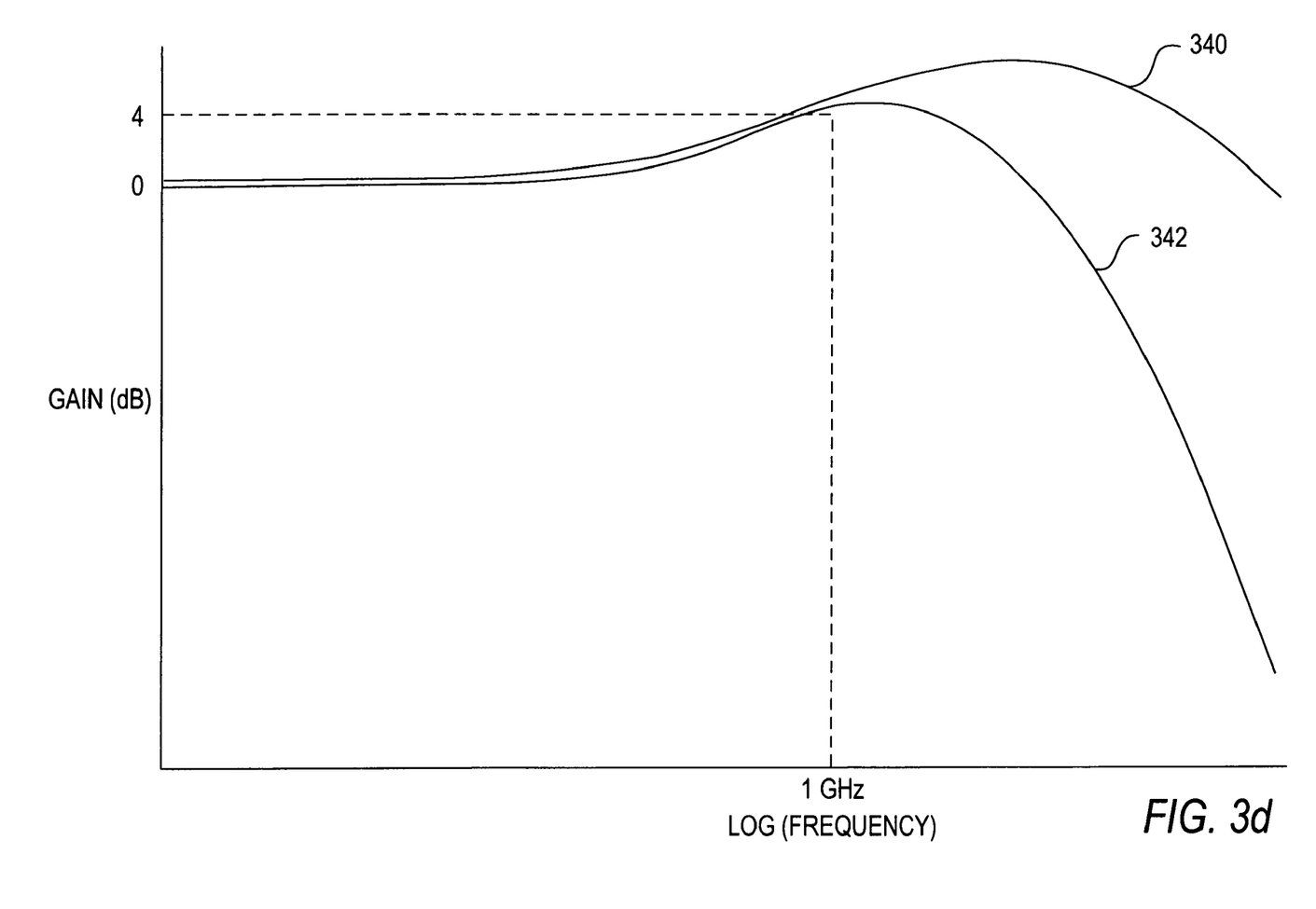
FIG. 3d is a Bode plot that illustrates the cross-talk filtering functionality provided by an equalization circuit in accordance with the present invention.

FIG. 3d is an illustrative Bode plot that shows the cross-talk filtering functionality provided by an equalization circuit in accordance with the present invention. Crosstalk occurs when a signal from one signal path is electromagnetically coupled onto a nearby signal path.

Two illustrative frequency response curves 340 and 342 of equalization circuit 106 (FIG. 2) are shown in FIG. 3d. Curve 340 corresponds to an equalization circuit without crosstalk filtering and curve 342 corresponds to an equalization circuit with crosstalk filtering. Both curves provide the same amount of gain for a 1 GHZ data signal. For example, if a 1 GHz data signal is transmitted across a transmission medium which causes 4 dB of attenuation, equalization circuit 106 may be configured to have either frequency response for restore the data signal to its original strength.

However, if equalization circuit 106 is configured to have a frequency response corresponding to curve 340, high frequency interference coupled from nearby signal paths would be amplified. This would be especially detrimental in low-frequency applications because signals traveling on nearby signal paths are almost certainly being transmitted at higher frequencies, and even if not, lower-frequency signals that are not in-band are not amplified. On the other hand, if equalization circuit 106 is configured to have a frequency response corresponding to curve 342, high frequency signals would be significantly attenuated. This approach is called crosstalk filtering, which allows the cutoff frequency for an equalization circuit to be programmably selected. In some embodiments, the cutoff frequency is selected at the frequency at which a data signal is transmitted. This allows the frequency response of the equalization circuit to peak at the transmission frequency of the data signal.

Crosstalk filtering may be implemented as a capacitive load on stages 202 (FIG. 2) or as a separate capacitive load from stages 202 at the output of equalization circuit 106. The amount of capacitive loading may be programmably controlled, which determines the location of the cutoff frequency. Generally, a higher capacitive load results in a lower cutoff frequency. The capacitive loading may be limited to producing roll-off at a predetermined range of frequencies.

In some embodiments, an m-bit control signal may be provided to allow equalization circuit 106 (FIG. 2) to select from $2^m$ frequencies within the predetermined frequency range. In some embodiments, an m-bit control signal may be provided to select from $2^m$ capacitive load values for producing roll-off in the frequency response of equalization circuit 106.

Figure 4:
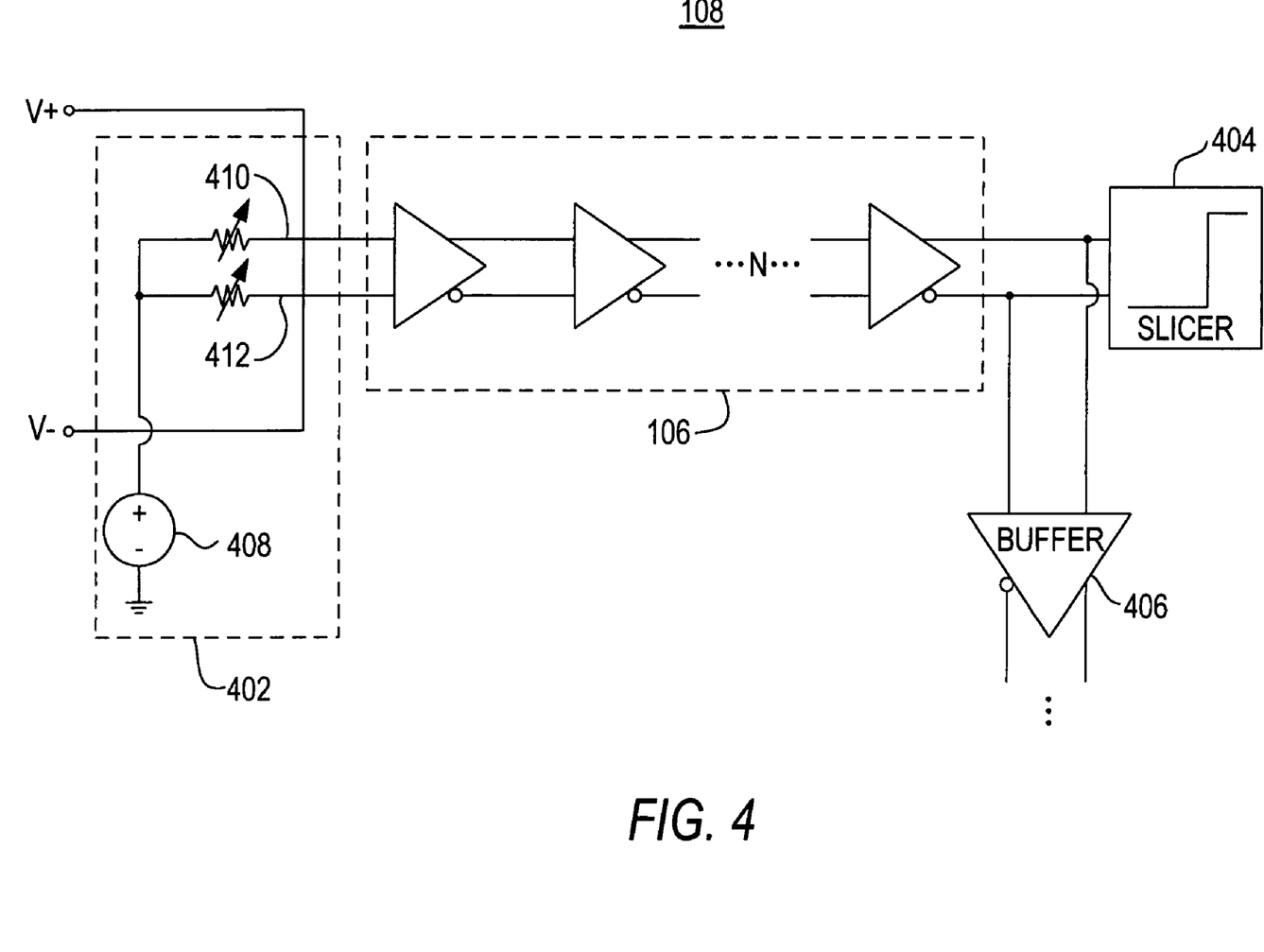
FIG. 4 is a block diagram of an illustrative receiver having an illustrative equalization circuit in accordance with the present invention.

FIG. 4 is a block diagram of receiver 108 having equalization circuit 106 in accordance with the present invention. As shown in FIG. 4, equalization circuit 106 is implemented on receiver 108, which receives a data signal transmitted across a transmission medium (e.g., transmission medium 104 (FIG. 1)). Receiver 108 may include a biasing circuit 402 coupled to the input of equalization circuit 106, a slicer 404 coupled to the output of equalization circuit 108, and a buffer 406 also coupled to the output of equalization circuit 106.

Biasing circuit 402 may include a voltage supply 408, which supplies a DC voltage to bias equalization circuit 106. Voltage supply 408 may also provide the transmitted data signal with an AC ground. Biasing circuit 402 may also include a pair of matching resistors 410 and 412. Matching resistors 410 and 412 may be selected to match the impedance of equalization circuit 106 with that of transmission medium 104 (FIG. 1) across which data is transmitted. For example, if transmission medium 104 is a 50Ω transmission line, then the resistances of matching resistors 410 and 412 should be set to 50Ω. Otherwise, data signals that are transmitted across transmission medium 104 would be subject to reflections and power loss. In some embodiments, the resistances of matching resistors 410 and 412 may be programmably controlled in order to provide impedance matching.

After equalization circuit 106 processes the data signal (i.e., compensates for attenuation), slicer 404 may process the output of equalization circuit 106 to generate a full-scale digital signal. Slicer 404 may be connected to a digital clock, such that slicer 404 decides within one clock cycle whether the output of equalization circuit 106 represents a logic high or a logic low. Thus, slicer 404 converts essentially an analog signal from the output of equalization circuit 106 to a digital signal that may be used by digital circuitry in receiver 108. For example, if receiver 108 is a part of a programmable logic device, the output of slicer 404 may be routed to the programmable logic device for further processing.

In some embodiments, slicer 404 may include clock data recovery (CDR) circuitry to recover clock and data information from the transmitted data signal. CDR circuitry may use a phase-locked loop (PLL) to recover clock information with the correct amount of phase. The clock information may then be used to sample data from the data signal.

Receiver 108 may also include buffer 406. Buffer 406 may be used to drive other circuitry with the output of equalization circuit 106. The input resistance of buffer 406 is infinite, and therefore does not affect the output resistance of equalization circuit 106. The output of buffer 406 may be coupled to other circuitry with non-infinite input resistances to insulate those resistances from the output resistance of equalization circuit 106. Without buffer 406, the bandwidth of equalization circuit 106 would be affected by any capacitive loading on the inputs of the other circuitry. Such capacitive loading would affect the locations of poles in the frequency response of equalization circuit 106.

In some embodiments, buffer 406 may be coupled to signal detect circuitry (not shown). Signal detect circuitry may be used to detect whether a data signal is being received by receiver 108. When the signal detect circuitry detects that an input is being received, it may produce an output signal. The output signal may enable slicer 404 process the received data signal.

In some embodiments, buffer 406 may be coupled to a loop-back buffer (not shown). The loop-back buffer may redirect the output of receiver 108 to other circuitry for processing. For example, the loop-back buffer may redirect the output of receiver 108 to a transmitter driver that may drive the output onto pins for observation by an oscilloscope. In another example, the loop-back buffer may redirect the output of receiver 108 to a circuit to detect the validity (e.g., bit error rate) of the received data.

In some embodiments, the output of buffer 406 may be coupled to the input of equalization circuit 106 to provide negative feedback to equalization circuit 106 (not shown), which allows equalization circuit 106 to apply a gain (e.g., based on a feedback ratio) to the output signal.

In some embodiments, the output of buffer 406 may be coupled to offset cancellation circuitry (not shown). Offset occurs, for example, when the inputs of one of stages 202 are unbalanced. For example, offset may be present if one of the stages produces an output even when the differential input is zero. Offset may accumulate from stage to stage, therefore it may be desirable to cancel offset at the output of all of the stages. This may be accomplished by correcting the output of equalization circuit 106 and feeding the corrected signal back to the input of equalization circuit 106.

The foregoing is merely illustrative of the principles of this invention and various modifications can be made by those skilled in the art without departing from the scope and spirit of the invention.

What is claimed is:

1. Receiver circuitry for receiving a data signal transmitted by a driver over a transmission medium, the receiver circuitry comprising:

equalization circuitry for programmably providing equalization to the data signal received at an input of the equalization circuitry, wherein the equalized data signal is provided at an output of the equalization circuitry, the equalization circuitry comprising:

one or more stages, wherein each stage is configured to:

insert a zero in a transfer function of the equalization circuitry;

receive a first frequency control signal different from a second frequency control signal provided to another of the one or more stages; and select a frequency location of the inserted zero identified by the first frequency control signal;

wherein the frequency location of each inserted zero is selected to apply sufficient gain to the data signal to compensate for an attenuation caused by the transmission medium; and a buffer having an input and an output, wherein the input of the buffer is coupled to the output of the equalization circuitry to isolate the impedances of other circuitry coupled to the buffer from the output impedance of the equalization circuitry, and wherein the output of the buffer is coupled to the input of the equalization circuitry.

2. The receiver circuitry of claim 1, wherein each of the one or more stages is further configured to control a frequency location of a pole in the transfer function of the equalization circuitry.

3. The receiver circuitry of claim 2, wherein the frequency location of the pole is selected to filter out high frequency noise in the data signal.

4. The receiver circuitry of claim 1, wherein each of the one or more stages is further configured to provide a desired amount of DC gain to the data signal.

5. The receiver circuitry of claim 1, wherein the frequency location of each inserted zero is selected to cause the slope of the gain to be equal and opposite to the slope of the attenuation caused by the transmission medium.

6. The receiver circuitry of claim 1, wherein stages of the one or more stages are coupled in series.

7. The receiver circuitry of claim 1, wherein stages of the one or more stages are cascaded.

8. The receiver circuitry of claim 1 further comprising:
bias circuitry configured to provide DC biasing to the data signal and impedance matching with the transmission medium.

9. The receiver circuitry of claim 1, wherein one of the other circuitry is a signal detect circuit.

10. The receiver circuitry of claim 1, wherein one of the other circuitry is an offset cancellation circuit.

11. The receiver circuitry of claim 1, wherein the respective frequency locations of each inserted zero is selected at least in part by the output of the equalization circuit using a negative feedback loop.

12. Receiver circuitry for receiving a data signal transmitted by a driver over a transmission medium, the receiver circuitry comprising:
equalization circuitry for programmably providing equalization to the data signal, the equalization circuitry comprising:
one or more stages, wherein each stage is configured to:
insert a zero in a transfer function of the equalization circuitry;
receive a first frequency control signal different from a second frequency control signal provided to another of the one or more stages; and
select a frequency location of the inserted zero identified by the first frequency control signal;
wherein the frequency location of each inserted zero is selected to apply sufficient gain to the data signal to compensate for an attenuation caused by the transmission medium; and
a slicer coupled to an output of the equalization circuitry to convert the data signals into full-scale digital signals, wherein the slicer comprises clock data recovery circuitry that recovers clock and data information from the data signal.

13. A method of providing equalization to a data signal transmitted over a transmission medium, the method comprising:
providing an equalizer with first and second stages;
inserting one or more zeros in a transfer function implemented by the first stage of the equalizer;
defining, for the first stage, a first set of frequency ranges in which to insert a zero, defining, for the second stage, a second set of frequency ranges in which to insert a zero, wherein the frequency ranges of the first set overlap with the frequency ranges of the second set and together cover a continuous frequency range that is wider than any one of the frequency ranges of the first and second sets;
controlling the respective frequency locations of the one or more inserted zeros in the first stage to provide sufficient gain to compensate for the attenuation caused by the transmission medium; and
applying the data signal to the transfer function using the first stage to produce an equalized data signal.

14. The method of claim 13, further comprising controlling the respective frequency locations of one or more poles to filter out unwanted high frequency noise coupled onto the data signal.

15. The method of claim 13, further comprising providing a desired amount of DC gain to the transfer function.

16. The method of claim 13, further comprising processing the equalized data signal to produce a full-scale digital signal.

17. The method of claim 13, wherein controlling the respective frequency locations of the one or more inserted zeros is based on user input.

18. The method of claim 13, wherein the respective frequency locations of the inserted zeros are selected to cause the slope of the gain to be equal and opposite to the slope of the attenuation caused by the transmission medium.

19. The method of claim 13, wherein the respective frequency locations of the inserted zeros are controlled at least in part using a negative feedback loop.

20. The receiver circuitry of claim 1, wherein at least one stage controls the frequency location of the inserted zero independently of the other stages.

21. The receiver circuitry of claim 1, wherein at least one stage is configurable and is programmably controlled to insert the zero and control the frequency location of the inserted zero.

22. The receiver circuitry of claim 12, wherein at least one stage controls the frequency location of the inserted zero independently of the other stages.

23. The receiver circuitry of claim 12, wherein at least one stage is configurable and is programmably controlled to insert the zero and control the frequency location of the inserted zero.

24. Equalization circuitry for providing equalization to a data signal received at an input of the equalization circuitry over a transmission medium, the equalization circuitry comprising:
a stage configured to:
insert a zero in a transfer function of the equalization circuitry,
receive a first frequency control signal that is different from a second frequency control signal provided to another stage, and
select a frequency location of the zero identified by the first frequency control signal to compensate for an attenuation caused by the transmission medium; and
a buffer having an input and an output, wherein the input is coupled to an output of the equalization circuitry to isolate impedances of other circuitry coupled to the buffer from an output impedance of the equalization circuitry, and wherein the output of the buffer is coupled to the input of the equalization circuitry.

25. Equalization circuitry for providing equalization to a data signal received over a transmission medium, the equalization circuitry comprising:
- a stage configured to:
  - insert a zero in a transfer function of the equalization circuitry,
  - receive a first frequency control signal that is different from a second frequency control signal provided to another stage, and
  - select a frequency location of the zero identified by the first frequency control signal to compensate for an attenuation caused by the transmission medium; and
- a slicer coupled to an output of the equalization circuitry to convert the data signals into full-scale digital signals, wherein the slicer comprises clock data recovery circuitry that recovers clock and data information from the data signal.

26. The method of claim 13, further comprising:
- receiving with the at least one of the stages a first frequency control signal that is different from a second frequency control signal provided to another of the stages; and
- wherein the controlling the respective frequency locations of the one or more inserted zeros comprises selecting a frequency location of the one or more inserted zeros identified by the first frequency control signal.

27. Receiver circuitry for receiving a data signal transmitted by a driver over a transmission medium, the receiver circuitry comprising:
- equalization circuitry for programmably providing equalization to the data signal received at an input of the equalization circuitry, wherein the equalized data signal is provided at an output of the equalization circuitry, the equalization circuitry comprising:
  - one or more stages, wherein each stage is configured to:
    - insert a zero in a transfer function of the equalization circuitry; and
    - control a frequency location of the inserted zero;
  - wherein the frequency location of each inserted zero is controlled to apply sufficient gain to the data signal to compensate for an attenuation caused by the transmission medium;
  - a buffer having an input and an output, wherein the input of the buffer is coupled to the output of the equalization circuitry to isolate the impedances of other circuitry coupled to the buffer from the output impedance of the equalization circuitry, wherein the output of the buffer is coupled to the input of the equalization circuitry; and
- bias circuitry configured to provide DC biasing to the data signal and impedance matching with the transmission medium.

28. Receiver circuitry for receiving a data signal transmitted by a driver over a transmission medium, the receiver circuitry comprising:
- equalization circuitry for programmably providing equalization to the data signal, the equalization circuitry comprising:
  - one or more stages, wherein each stage is configured to:
    - insert a zero in a transfer function of the equalization circuitry; and
    - control a frequency location of the inserted zero;
  - wherein the frequency location of each inserted zero is controlled to apply sufficient gain to the data signal to compensate for an attenuation caused by the transmission medium;
  - a slicer coupled to the output of the equalization circuitry to convert the data signals into full-scale digital signals, wherein the slicer comprises clock data recovery circuitry that recovers clock and data information from the data signal; and
- bias circuitry configured to provide DC biasing to the data signal and impedance matching with the transmission medium.

29. Equalization circuitry for providing equalization to a data signal received at an input of the equalization circuitry over a transmission medium, wherein the equalized data signal is provided at an output of the equalization circuitry, the equalization circuitry comprising:
- a stage configured to insert a zero in a transfer function of the equalization circuitry, wherein
  - a frequency location of the zero is controlled to compensate for an attenuation caused by the transmission medium;
- a buffer having an input and an output, wherein the input of the buffer is coupled to an output of the equalization circuitry to isolate impedances of other circuitry coupled to the buffer from an output impedance of the equalization circuitry, and wherein the output of the buffer is coupled to the input of the equalization circuitry; and
- bias circuitry configured to provide DC biasing to the data signal and impedance matching with the transmission medium.

30. Equalization circuitry for providing equalization to a data signal received over a transmission medium, the equalization circuitry comprising:
- a stage configured to insert a zero in a transfer function of the equalization circuitry, wherein
  - a frequency location of the zero is controlled to compensate for an attenuation caused by the transmission medium;
- a slicer coupled to an output of the equalization circuitry to convert the data signals into full-scale digital signals, wherein the slicer comprises clock data recovery circuitry that recovers clock and data information from the data signal; and
- bias circuitry configured to provide DC biasing to the data signal and impedance matching with the transmission medium.

31. A method of providing equalization to a data signal transmitted over a transmission medium, the method comprising:
- applying DC bias to the data signal and impedance matching with the transmission medium;
- providing an equalizer with first and second stages;
- inserting one or more zeros in a transfer function implemented by the first stage of the equalizer;
- defining, for the first stage, a first set of frequency ranges in which to insert a zero, defining, for the second stage, a second set of frequency ranges in which to insert a zero, wherein the frequency ranges of the first set overlap with the frequency ranges of the second set and together cover a continuous frequency range that is wider than any one of the frequency ranges of the first and second sets;
- controlling the respective frequency locations of the one or more inserted zeros in the first stage to provide sufficient gain to compensate for the attenuation caused by the transmission medium; and
- applying the data signal to the transfer function using the the first stage to produce an equalized data signal.

32. The receiver circuitry of claim 1 wherein:

a first stage of the one or more stages is configured to insert the zero in one of a plurality of selectable frequency locations within a predetermined frequency range of the first stage; and the equalization circuitry further comprises a configurable device adapted to select the frequency location in which the zero is inserted among any of the plurality of selectable frequencies of the first stage by providing, to the first stage, the first frequency control signal in digital form.

33. The receiver circuitry of claim 1 wherein:

a first stage of the one or more stages includes a plurality of selectable capacitive load values, wherein the capacitive load determines the location of a pole in the transfer function; and the equalization circuitry further comprises a configurable device adapted to select the capacitive load value of the first stage among any of the plurality of selectable capacitive load values of the first stage by providing, to the first stage, a capacitive load control signal in digital form.

* * * * *